United States Patent [19]

Baker et al.

[11] 4,315,876
[45] Feb. 16, 1982

[54] METHOD FOR HOT PRESS FORMING ARTICLES

[75] Inventors: Robert R. Baker; Dale L. Hartsock, both of Livonia, Mich.

[73] Assignee: Ford Motor Company, Dearborn, Mich.

[21] Appl. No.: 62,601

[22] Filed: Jul. 31, 1979

[51] Int. Cl.² ............................................. C04B 35/60
[52] U.S. Cl. ................................. 264/40.1; 264/325; 264/332
[58] Field of Search ..................... 264/40.1, 40.5, 332, 264/325

[56] References Cited

U.S. PATENT DOCUMENTS

| | | | |
|---|---|---|---|
| 3,989,438 | 11/1976 | Smith | 264/332 |
| 4,127,684 | 11/1978 | Bolser | 264/134 |
| 4,140,469 | 2/1979 | Bolser | 425/520 |

*Primary Examiner*—John A. Parrish
*Attorney, Agent, or Firm*—William E. Johnson; Olin B. Johnson

[57] ABSTRACT

This disclosure relates to an improved method for achieving the best bond strength and for minimizing distortion and cracking of hot pressed articles. In particular, in a method for hot press forming both an outer facing circumferential surface of and an inner portion of a hub, and of bonding that so-formed outer facing circumferential surface to an inner facing circumferential surface of a pre-formed ring thereby to form an article, the following improvement is made.

Normally, in this method, the outside ring is restrained by a restraining sleeve of ring-shaped cross-section having an inside diameter. A die member, used to hot press form the hub, is so-formed as to have an outside diameter sized to engage the inside diameter of the restraining sleeve in a manner permitting relative movement therebetween. The improved method is one in which several pairs of matched restraining sleeve and die member are formed with each matched pair having a predetermined diameter. The predetermined diameter of each matched pair is different from another matched pair by stepped increments. The largest inside diameter of a restraining sleeve is equal to the diameter of the outer facing circumferential surface of the hub. Each pair of the matched restraining sleeve and die member is used to form an article in which an inside hub is bonded to an outside ring. The several samples so-formed are evaluated to determine which sample has the best bond formed between the hub and the ring with the least or no cracking or distortion in the ring portion of the article. Thereafter, the matched restraining sleeve and die member which form the article having the best bonding characteristics and least distortion cracking is then used for repeated formations of articles.

3 Claims, 2 Drawing Figures

METHOD FOR HOT PRESS FORMING ARTICLES

STATEMENT

The invention herein described was made in the course of or under a contract or subcontract with the Department of Energy, the contact number being DAAG-46-71-C-0162.

BACKGROUND OF THE INVENTION AND PRIOR ART STATEMENT

The closest prior art known to us is the material contained in U.S. Pat. No. 4,140,469 issued Feb. 20, 1979 for "Apparatus for Forming Ceramic Bodies." This patent issued to Robert R. Baker, one of the inventors set forth herein.

U.S. Pat. No. 4,140,469 discloses an apparatus designed for bonding a ceramic body to an interior annular surface of a ring-shaped body formed of ceramic material. The apparatus disclosed includes a blade ring 10 encapsulated by an encapsulating medium 20, with the exception of an inwardly facing bonding surface 16 of the blade ring. The encapsulated blade ring is held in the apparatus by means of a restraining sleeve 38 of ring shape. The patent indicated that this restraining sleeve 38 has an inner diameter equal to the diameter of the inwardly facing bonding surface 16 of the encapsulated blade ring 10. The disclosed structure also includes a die member 56 which has a diameter slightly less than the inside diameter of the restraining sleeve 38 so that the die member is movable therein.

As disclosed in U.S. Pat. No. 4,140,469, the die member 56 is moved downwardly within the restraining sleeve 38 so that silicon nitride powder 66 contained within a volume 64 is compacted in order to form a hub element 18, and simultaneously with the formation of that element, to achieve a bonding of that element to the inwardly facing bonding surface 16 of the blade ring 10.

The purpose of the method of the present invention is to achieve the best bond possible and also to minimize any distortion and/or cracking of the outer ceramic body, in the particular case described herein, the blade ring 10, when forming of the inner ceramic body 18 which is not only formed, but also simultaneously bonded to an inwardly facing surface 16 of the outer body. The exact manner in which the improvement in the method is achieved will be set forth in greater detail in the remaining portion of this specification.

SUMMARY OF THE INVENTION

This invention relates to a method of hot pressing material to form an article and, more particularly, to an improvement in a method for hot press forming both an outer facing circumferential surface of and an inner portion of a hub, and of bonding that so-formed outer facing circumferential surface of the so-formed hub to an inner facing circumferential surface of a pre-formed outside ring thereby to form an article.

The improved method is one in which the pre-formed outside ring is restrained by a restraining sleeve of ring-shaped cross-section having an inside diameter. The method is also one wherein a die member used to hot press form the hub has an outside diameter sized to engage the inside diameter of the restraining sleeve in a manner permitting relative movement therebetween.

In accordance with the teachings of this specification, the improved method is one to form the best bond and to minimize distortion and cracking of so-formed articles when the method is repeatedly used to form a series of articles. In accordance with the teachings of the improved method, several pairs of a matching restraining sleeve and a die member are formed. Each matched pair of restraining sleeve and die member has a predetermined diameter. The predetermined diameter of each pair is different from one another by stepped increments. The largest inside diameter of a restraining sleeve is a diameter equal to the diameter of the outer facing, circumferential surface of the hub.

Each pair of matched restraining sleeve and die member is used to form a sample of an article in which an inside hub is formed and bonded to an outside ring. After the formation of the several sample articles, the sample articles are evaluated to determine which sample article has the best bond formed between the hub thereof and the ring thereof and the least degree of distortion and/or cracking of the ring. Thereafter, for repeated formation of a plurality of articles in which an inside hub is bonded to an outside ring, that matched restraining sleeve and die member which gave the article the best bonding and least distortion characteristics is repeatedly used in the article forming process.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of specific embodiments when read in conjunction with the accompanying drawings, wherein like reference characters indicate like parts throughout the several figures, and in which:

DESCRIPTION OF THE PREFERRED EMBODIMENT

This invention constitutes an improvement in the method of forming ceramic bodies by means of a hot pressing operation as shown in U.S. Pat. No. 4,140,469 issued Feb. 20, 1979 to Robert R. Baker, one of the inventors herein. The patent discloses a method of forming ceramic bodies, but claims specifically the apparatus for carrying out the forming method.

Figure 1:
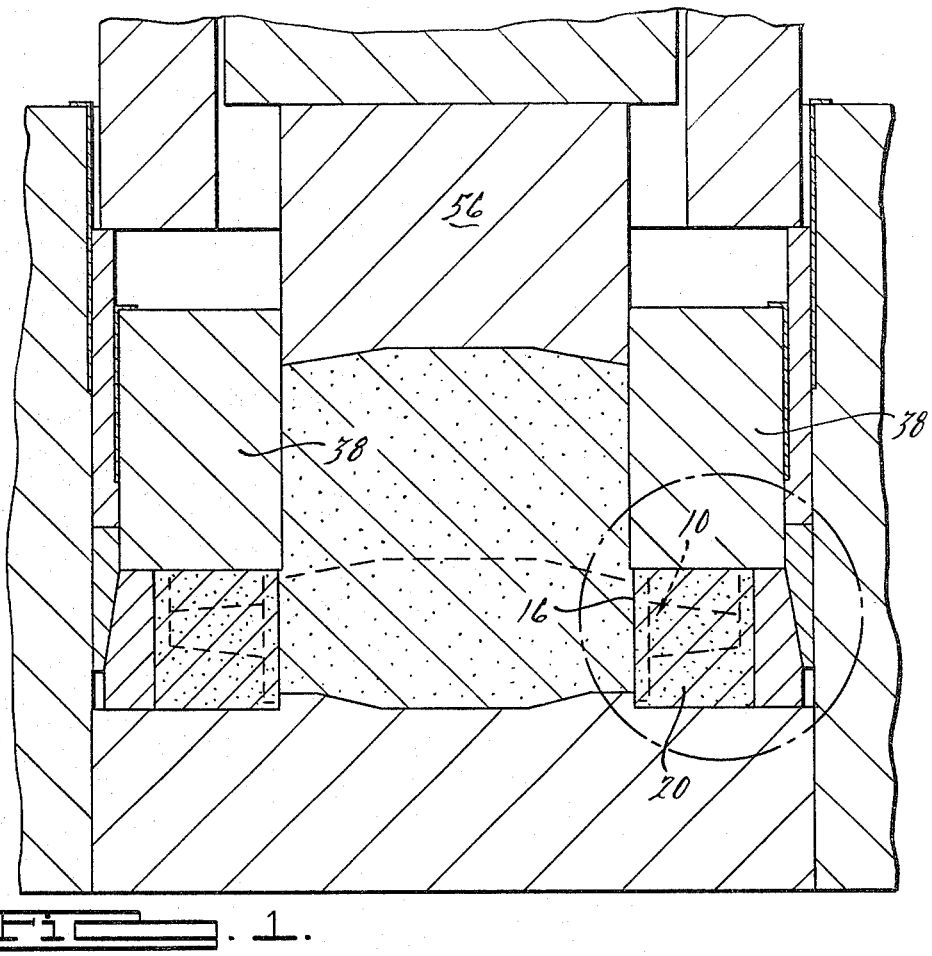
FIG. 1 is a drawing in cross-section showing, in elevation, an apparatus in which the method of this invention can be practiced.

Briefly, that patent shows an apparatus which is used to compact silicon nitride powder in order to simultaneously form a hub having an outer circumferential surface and bond that outer circumferential surface to an inwardly facing surface of an encapsulated blade ring. The patent discloses that this forming and bonding operation takes place under heat and pressure. The patent also discloses that a die member (56) has a diameter slightly less than the inside diameter of a restraining sleeve (38) so that the die member is movable therewithin. The patent also teaches that the restraining sleeve (38) has an inner diameter equal to the diameter of the inwardly facing bonding surface (16) of the encapsulated blade ring. The drawings of the patent show this relationship clearly in FIG. 1.

Since the apparatus used in the method of the invention set forth herein is similar to that apparatus used and disclosed in U.S. Pat. No. 4,140,469, no detailed description of the apparatus will be set forth herein. A full understanding of the working of the apparatus may be gained by reading the aforementioned patent. In order to carry over between the patent and this specification, like numerals and titles will be given to the same parts in this specification as have been given to the parts in the patent.

In the drawings there is seen a blade ring generally identified by the numeral 10. This blade ring has an inwardly facing bonding surface 16. The blade ring is encapsulated in an encapsulating medium 20, as by a method described in U.S. Pat. No. 4,127,684. Generally, all of the blade ring 10 is encapsulated, with the exception of the inwardly facing bonding surface 16 which has no encapsulant placed thereover. After the blade ring has been encapsulated, the entire encapsulated body is now a ring shaped body formed of ceramic material having its inwardly facing bonding surface 16 exposed.

Part of the structure used in the bonding operation is a restraining sleeve 38. In accordance with the teachings of U.S. Pat. No. 4,140,469, the restraining sleeve has an inner diameter equal to the diameter of the inwardly facing bonding surface 16 of the encapsulated blade ring. In accordance with the method of this invention, a number of different restraining sleeves are used, each restraining sleeve having a different inside diameter, with the greatest diameter being equal to the diameter of the inwardly facing bonding surface 16 of the encapsulated blade ring 10. This series of stepped diameters will be described in greater detail hereinbelow, but it is an element of this invention which differentiates it from the method taught in U.S. Pat. No. 4,140,469.

Associated with the restraining sleeve 38 is a die member 56. This die member has a diameter slightly less than the inside diameter of the restraining sleeve 38 so that the die member is movable therewithin. The exact manner in which the restraining sleeve 38 and the die member 56 cooperate with one another in order to form and simultaneously bond a hub to the inwardly facing bonding surface 16 of the blade ring, is fully described in the aforementioned U.S. Pat. No. 4,140,469 and will not be discussed in detail herein.

METHOD OF THE INVENTION

The method of this invention constitutes an improvement on a prior known method set forth in U.S. Pat. No. 4,140,469. The purpose of the improvement of the method is to obtain the best bonding and to minimize distortion and cracking of articles formed by using the method.

In accordance with the teachings of the method of this invention, several pairs of matched restraining sleeve 38 and die member 56 are formed. Each matched pair has a predetermined diameter for the inside diameter of the restraining sleeve. The outside diameter of the die member is sized so that it fits within the matched restraining sleeve and is movable therewithin. The diameter of the restraining sleeve in each of the matched pairs of restraining sleeve and die member is different than the diameter of any other matched pair. Generally, the difference in diameters from one another are in stepped radial increments of about 0.020 inches. The largest inside diameter of a restraining sleeve is equal to the diameter of the outer facing circumferential surface 16 of the encapsulated blade ring.

Figure 2:
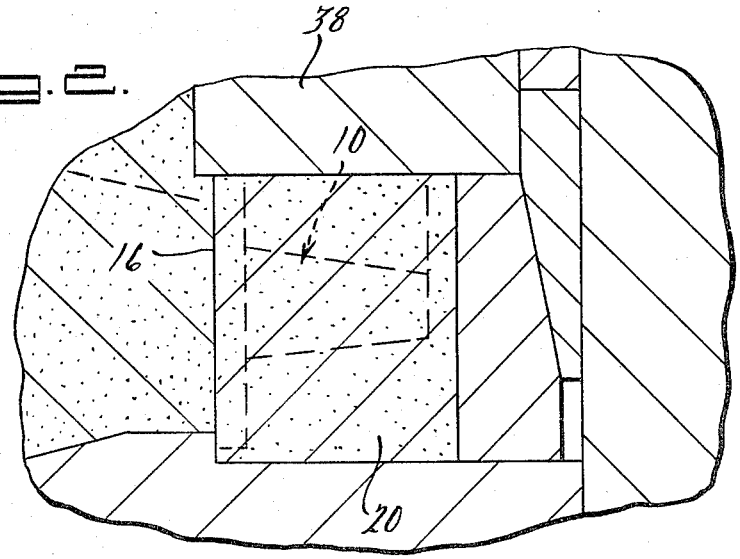
FIG. 2 is an exploded view showing some details of an area encircled in FIG. 1.

There is shown in best detail in FIG. 2 of the drawing a condition in which the restraining sleeve 38 has an inside diameter which is less than the inside diameter of the bonding surface 16. In this way, the restraining sleeve of different sets of restraining sleeve matches up with the surface 16 and then gradually overlaps the surface in a step-wise progression. It may be necessary to only have three or four steps in the progression in order to make the method of this invention operable. However, in other cases, the individual incremental steps may be smaller, for example, 0.001 inches radially and thereby increase the total number of matched pairs of restraining sleeves and die members used in order to carry out the method.

Each pair of restraining sleeve and associated die member is used in accordance with the teachings of U.S. Pat. No. 4,140,469 to hot press form and bond a hub to the inwardly facing bonding surface of the ring element. Thus, if there were four pairs of matched restraining sleeve and die members in a set, four articles would be manufactured.

After the matched pairs of restraining sleeve and die member have been used, and the individual articles from each pair has been formed, the articles are evaluated to determine which of the articles has the best bonding characteristics of the hub to the inwardly facing surface of the ring while minimizing the distortion and/or cracking of the blade ring rim. As is well known in the art, the best way of evaluating the article is to cut across a bond and examine the same under a microscope to insure adequate densification of the silicon nitride powder has been achieved and the densified powder is indeed bonded to the blade ring. The article is also examined in the cut state to determine the degree of blade ring distortion and/or cracking.

We have recently found that the best bonds are usually not achieved when the restraining sleeve has the same inside diameter which matches the inside diameter of the surface of the ring to which the hub is to be bonded. Depending on the type and size of the article, we have found that restraining sleeves having an overlap of from 0.005 to 0.060 inches form the best joint with very little or no distortion, this, of course, depending upon the thickness of the material and the amount of surfaces to be formed. However, this particular method does give us a method by which an initial determination may be made of what are the best parameters to be used in the bonding operation. Thus, by making a series of samples, one may select the matched set of restraining sleeve and die member which gives the best bonding characteristics, while minimizing ring distortion and/or cracking.

When the best matched pair of restraining sleeve and die member is selected, this restraining sleeve and die member is thereafter used to produce a series of articles. This ensures that the series of articles produced will have the best characteristics with respect to bonding of the elements together with little or no distortion or cracking in the preformed portion of the article.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

What is claimed:

1. In a method for hot press forming both an outer facing circumferential surface of and an inner portion of a hub and of bonding that so-formed outer facing circumferential surface of the so-formed hub to an inner facing circumferential surface of a preformed outside ring thereby to form an article, the method being one in which the pre-formed outside ring is restrained by a restraining sleeve of ring-shaped cross-section having an inside diameter and wherein a die member used to engage the inside diameter of the restraining sleeve in a manner permitting relative movement therebetween, the improvement to achieve the best bond strength to minimize distortion and cracking of so-formed articles when the method is repeatedly used to form a series of articles, which method comprises the steps of:

forming several pairs of a matched restraining sleeve and die member with each matched pair having a predetermined diameter, said predetermined diameter being different from one another by stepped increments, the largest inside diameter of a restraining sleeve being equal to the diameter of the outer facing circumferential surface of the hub;

using each of said pair of said matched restraining sleeve and die member to form a sample of an article in which an inside hub is bonded to an outside ring;

evaluating said several formed samples to determine which sample has the best bond formed between the hub thereof and the ring thereof while minimizing any distortion of the ring; and thereafter using for repeated formation of articles in which an inside hub is bonded to an outside ring that matched restraining sleeve and die member which formed the article with the best bonding characteristics.

2. The method of claim 1 wherein said stepped increments are in a range of radial steps of from about 0.005 inches to 0.065 inches.

3. The method of claim 1 wherein said stepped increments are radial steps of about 0.020 inches.

* * * * *